United States Patent [19]

Robson

[11] Patent Number: 5,305,404
[45] Date of Patent: Apr. 19, 1994

[54] FIBER OPTIC COUPLER

[75] Inventor: Christopher D. Robson, Horseheads, N.Y.

[73] Assignee: Corning Incorporated, Corning, N.Y.

[21] Appl. No.: 75,665

[22] Filed: Jun. 11, 1993

Related U.S. Application Data

[62] Division of Ser. No. 944,193, Sep. 11, 1992, Pat. No. 5,240,489.

[51] Int. Cl.⁵ .................................. E02B 6/26
[52] U.S. Cl. ............................. 385/43; 385/96
[58] Field of Search ........................ 385/43, 96

[56] References Cited

U.S. PATENT DOCUMENTS

| | | | |
|---|---|---|---|
| 4,715,679 | 12/1987 | Bhagavatula | 385/124 |
| 4,801,185 | 1/1989 | Bricheno | 385/43 |
| 4,842,359 | 6/1989 | Imoto et al. | 385/43 |
| 4,931,076 | 6/1990 | Berkey | 385/95 |
| 5,009,692 | 4/1991 | Miller et al. | 385/95 |
| 5,011,251 | 4/1991 | Miller et al. | 385/43 |
| 5,131,735 | 7/1992 | Berkey et al. | 385/43 |
| 5,240,489 | 8/1993 | Robson | 385/51 |
| 5,251,276 | 10/1993 | Berkey et al. | 385/43 |

Primary Examiner—Frank Gonzalez
Attorney, Agent, or Firm—W. J. Simmons, Jr.

[57] ABSTRACT

A fiber optic coupler is formed by providing a glass tube having a longitudinal bore and first and second funnels connecting the bore to the ends of the tube. The protective coating is stripped from the central portion of two optical fibers. The first and second fibers are threaded into the tube bore until the uncoated portions thereof are located within the bore. The protective coating of only one of the fibers extends into the first end of the bore, and the protective coating of only one of the fibers extends into the second end of the bore. The fibers extend beyond the tube ends. The bore diameter is just slightly larger than the sum of the diameter of the first fiber and the diameter of the coating of the second fiber. The resultant tight fit of the fibers in the tube promotes the retention the fibers in parallel alignment during the subsequent tube collapse step. The midregion of the tube is heated, collapsed about the fibers, and drawn to form a coupling region.

15 Claims, 3 Drawing Sheets

FIBER OPTIC COUPLER

This is a division of application Ser. No. 07/944,193, filed Sep. 11, 1992 now U.S. Pat. No. 5,240,489 issued Aug. 31, 1993.

BACKGROUND OF THE INVENTION

This invention relates to a method of making overclad fiber optic couplers that exhibit low excess loss.

Fiber optic couplers referred to as "fused fiber couplers" have been formed by positioning a plurality of fibers in a side-by-side relationship along a suitable length thereof and fusing the claddings together to secure the fibers and reduce the spacings between the cores. Various coupler properties can be improved by encapsulating the coupling region of the fibers in a matrix glass to form an "overclad coupler". Portions of the fibers to be fused are inserted into a glass tube having a refractive index lower than that of the fiber claddings. The tube has a longitudinal bore, each end of which is preferably connected to a respective tube end surface by a funnel that facilitates the insertion of the fibers. Since optical fibers have a protective coating thereon, that portion of the fibers that is to be positioned in the tube midregion must have the coating stripped therefrom. After the fibers are stripped and the uncoated portions are positioned in the tube bore, the tube midregion is collapsed onto the fibers; the central portion of the midregion is then drawn down or stretched to achieve the desired coupling.

In certain types of couplers, coupling is increased by twisting the fibers along the fused length of the fibers (U.S. Pat. No. 4,426,215). However, twisting the fibers is disadvantageous for certain purposes. Indeed, even microbends in the fiber can increase coupler excess loss. Therefore, various techniques have been developed to prevent or reduce fiber twisting or bending in overclad fiber optic couplers.

U.S. Pat. No. 4,931,076 teaches that the length of each fiber from which coating has been stripped should be shorter than the length of the tube bore to allow the coating to extend into both ends of the bore, thereby positioning each fiber within the bore cross-section. That patent further teaches that the lengths of the uncoated portions should be about equal and that those uncoated portions should be adjacent one another.

U.S. Pat. No. 5,009,692 also teaches the placement of fiber coatings in the tube bore, and further suggests that holes that are diamond-shaped or the like prevent the rotation of the fibers during the tube collapse step. That patent further states that regardless of the geometry of the bore, it is preferred that the bore size be no larger than that size that is sufficient to receive the coated fibers without causing the coating material to smear onto the wall of the bore, excessive bore size causing macrobend loss and/or twisting of fibers. It is noted that when the coatings of both fibers of a 2×2 coupler are situated in the tube bore, the bore diameter must be at least twice the diameter of the fiber coatings.

Couplers have also been made by stripping coating from the central portion of each of the the fibers, all uncoated portions being longer than the tube bore. Thus, when the uncoated portions of the fibers are centered in the tube bore, the coated portions of the fibers end in the middle of the funnels. This technique can employ a smaller bore diameter than the methods of the aforementioned U.S. Pat. Nos. 4,931,076 and 5,009,692; however, the fibers are not tightly held in parallel alignment during the tube collapse step.

SUMMARY OF THE INVENTION

It is therefore an object of the present invention to provide a method of positioning the fibers in an overclad tube during the manufacture of overclad fiber optic couplers in order to produce couplers having very low excess loss.

Briefly, the present invention relates to an overclad fiber optic coupler and to a method of making such a coupler. Employed in the method is a glass tube having first and second end surfaces, a midregion and first and second opposite end regions extending from the midregion to the end surfaces. A longitudinal bore extends within the tube. Protective coating is stripped from two coated optical fibers such that each fiber is composed of an uncoated portion that joins first and second coated portions. The fibers are threaded into the bore until their uncoated portions are located within the bore. The protective coating of only one of the fibers extends into the first end of the bore, and the protective coating of only one of the fibers extends into the second end of the bore. The tube is heated to collapse its midregion onto the fibers, and at least a portion of the midregion is drawn.

The glass tube can further comprise first and second funnels extending from the bore to the first and second end surfaces. The coated portion of one of the fibers is situated within the first funnel, and the coated portion of one of the fibers is situated within the second funnel.

The resultant fiber optic coupler includes an elongated body of matrix glass having a midregion and first and second end surfaces. First and second optical fibers extend through the midregion, the fibers being fused together and to the midregion. The diameter of the central portion of the midregion is smaller than the diameters of the body at the end surfaces. First and second longitudinal bore portions extend from the midregion toward the first and second end surfaces, the fibers extending through the first and second bore portions. Each of the fibers has a protective coating except for a uncoated portion within a portion of the elongated body. The protective coating of only one of the fibers extends into the first bore portion, and the protective coating of only one of the fibers extends into the second bore portion.

DETAILED DESCRIPTION OF THE INVENTION

Figure 1:
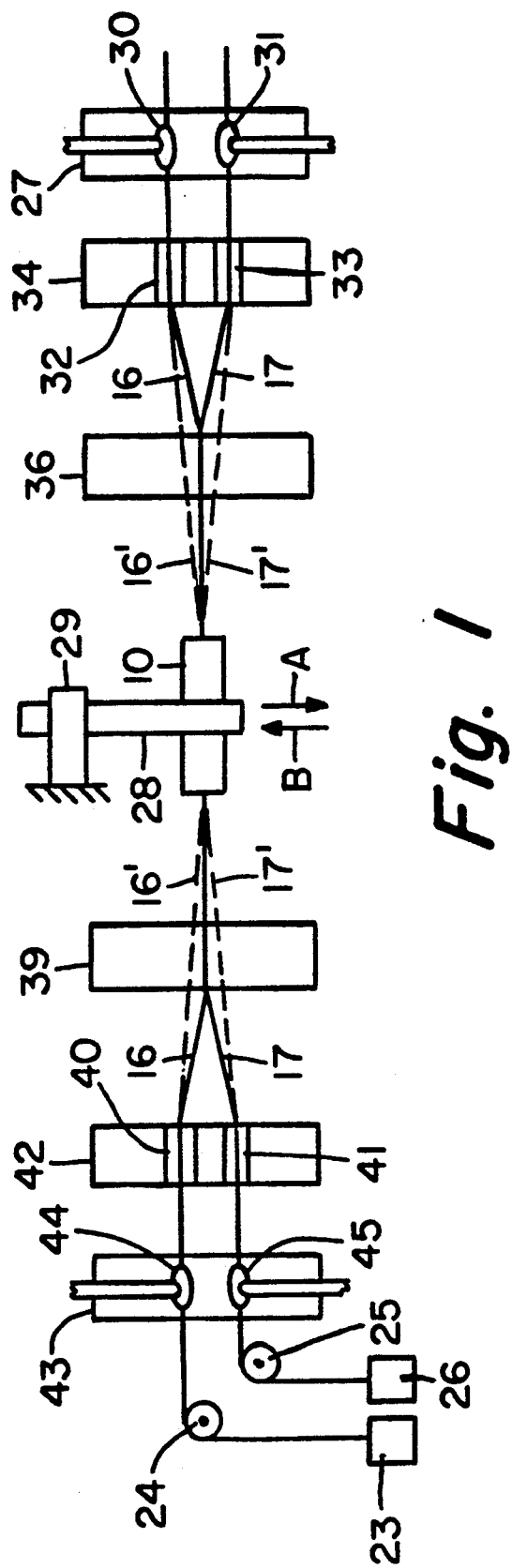
FIG. 1 is a schematic illustration of an apparatus for threading fibers into the tube.

The drawings are not intended to indicate scale or relative proportions of the elements shown therein.

In the process of making certain overclad fiber optic couplers, a portion of the protective coating of each fiber is removed intermediate the fiber ends, and the uncoated portions of the fibers are disposed within the bore of a glass tube. The midregion of the assembly so formed is heated and collapsed around the fibers, collapse of the midregion being facilitated by evacuating the tube bore. The central portion of the midregion is thereafter stretched to that diameter and coupling length which is necessary to obtain the desired coupling.

To ascertain the stretching distance, optical power can be coupled to an input optical fiber, and the output signals can be monitored to control process steps in the coupler manufacturing process. See, for example, U.S. Pat. No. 5,011,251. In the specific examples described below, output power was not monitored during stretching. In previous experience with 2×2 overclad fiber optic couplers, the total stretching distance for both stages (see FIG. 5) was usually about 11 mm. The couplers described in the examples were therefore initially elongated by some distance within that range. The optical characteristics of the resultant device were measured, and the stretching or elongation distance of the subsequently made coupler was adjusted in such a manner as to more nearly achieve the desired characteristics. By this process, the optimal stretching distance was achieved. Thereafter, all couplers of that type were stretched the optimal distance in order to achieve the desired optical characteristics. However, process parameters such as the elongation distance can be fine tuned as a result of optical characterization of the produced couplers.

After the fibers are threaded through the tube bore, and prior to coupler drawing, the fibers may be properly positioned for the tube collapse step by gluing them to a first end of the tube, pulling the fiber portions that extend from the bore at the second end of the tube, and gluing the fibers to the second end of the tube. The glue can be applied to less than the entire circumfirential region around the fibers, thereby leaving an opening between the bore and the glue, whereby access to the bore is retained for purposes such as cleaning, vacuum application and final gluing. Other techniques for gluing the fibers to the tube ends are taught in U.S. Pat. No. 4,931,076.

The fiber threading step can be performed either "off-line" (prior to mounting the tube in the stretch apparatus) or "on-line" (after the tube has been mounted in the stretch apparatus). In accordance with either technique, the operator can observe the position of the uncoated fibers and the adjacent coatings through the glass tube in order to properly position the fibers. On-line threading can be more difficult due to the equipment that surrounds the tube and thus obstructs the operator's view of the tube. Moreover, a microscope, which is optionally used to view the tube during threading, is more easily positioned adjacent the tube in an off-line threading operation.

A suitable fiber insertion station, which is shown in FIG. 1, comprises an aligned arrangement of clamping blocks 27 and 43, fiber positioning devices 34 and 42, and fiber positioning posts 36 and 39. Rubber surfaced clamps 30 and 31 are capable of retaining optical fibers against block 27. Similar clamps 44 and 45 are associated with block 43. Positioning device 34 contains spaced grooves 32 and 33, and device 42 contains grooves 40 and 41.

The operation of the fiber insertion station of FIG. 1 is as follows, reference being made to capillary tube 10 illustrated in FIGS. 2-4. Tube 10 is preferably composed of silica doped with $B_2O_3$ and optionally fluorine. Funnels 14 and 15 connect longitudinal bore 11 to end surfaces 12 and 13, respectively. While bore 11 is shown as being circularly shaped, it could be non-circular as described in U.S. Pat. No. 5,009,692. Tube 10 is pressed between prongs at the end of clamp 28 which is frictionally engaged by support arm 29 such that it can be moved in the direction of arrows A and B.

Coated optical fibers 16 and 17 are sufficiently long that connection can easily be made to the fiber "pigtails" extending from the coupler. Coated fibers 16 and 17 are composed of optical fibers 20 and 21 (each having core and cladding regions) and their protective coatings 18 and 19, respectively. A portion of coating 18 slightly longer than bore 11 is stripped from coated fiber 16. A first end of fiber 16 is threaded through bore 11. The first end is placed in groove 32 and is secured by clamp 30. The second end of fiber 16 is placed in groove 40, is pulled slightly, and is secured by clamp 44. At this time fiber 16 extends directly along dashed lines 16' from tube 10 to grooves 32 and 40. A small weight 23 is then clamped to the end of fiber 16 which extends from pulley 24. A portion of coating 19 slightly shorter than bore 11 is stripped from coated fiber 17. A first end of fiber 17 is threaded through bore 11 until the uncoated portion thereof is centered in tube 10. The first end of fiber 17 is placed in groove 33 and is secured by clamp 31. The second end of fiber 17 placed in groove 41, is pulled slightly, and is secured by clamp 45. At this time fiber 17 extends directly along dashed lines 17' from tube 10 to grooves 33 and 41. A small weight 26 is then clamped to the end of fiber 17 which extends from pulley 25. Clamps 44 and 45 are released, weights 23 and 26 providing tension to hold the fibers straight in tube 10 while the fibers are being glued to the funnels. Tube 10 is then released from clamp 28, whereby it becomes suspended by the fibers. If weights 23 and 26 did not tension the fibers, the weight of tube 10 would cause the fibers to sag between posts 36 and 39, and the fibers could bow within tube bore 11. After being released from clamp 28, tube 10 seeks a position along arrows A and B that is substantially midway between the line joining grooves 32 and 40 and the line joining grooves 33 and 41. A microscope can be focused onto this location to enable the operator to clearly see optical fibers 20 and 21 and coatings 18 and 19 within tube 10. At this time the operator can ascertain that the fibers are free from twist and that the short stripped section of fiber is centered in the bore. The operator then grasps the fibers where they extend between device 42 and post 39 and brings the fibers together at post 36 as shown by solid lines 16 and 17. The fibers are similarly positioned between device 34 and post 36.

Coating 19 protrudes beyond the bottoms (narrow ends) of funnels 14 and 15 and into bore 11 a sufficient distance d to stabilize the positions of the two fibers. Distance d must be sufficiently short that the coatings do not burn during the heating of the tube for the tube collapse and stretch steps. A length d of a few millimeters has been found to be suitable for a 32 mm long tube.

If tube 10 were made longer, the distance d could also be made longer.

The bore of capillary tube 10 is preferably just large enough to accept coatings 19 of coated fiber 17 alongside the uncoated portion of optical fiber 20 without causing the coating to smear onto the wall of the bore during the threading step. The resultant tight fit of the fibers in the tube promotes the retention the fibers in parallel alignment during the subsequent tube collapse step.

Figure 4:
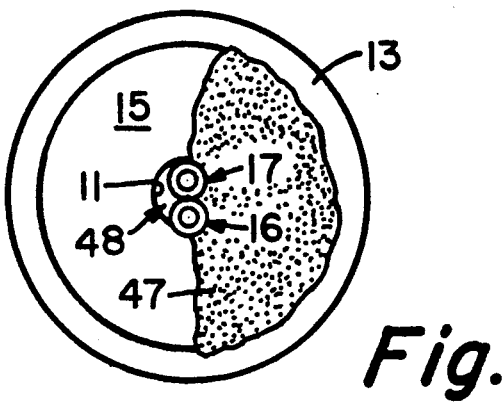
FIG. 4 is an end view of the preform of FIG. 3.
Figure 3:
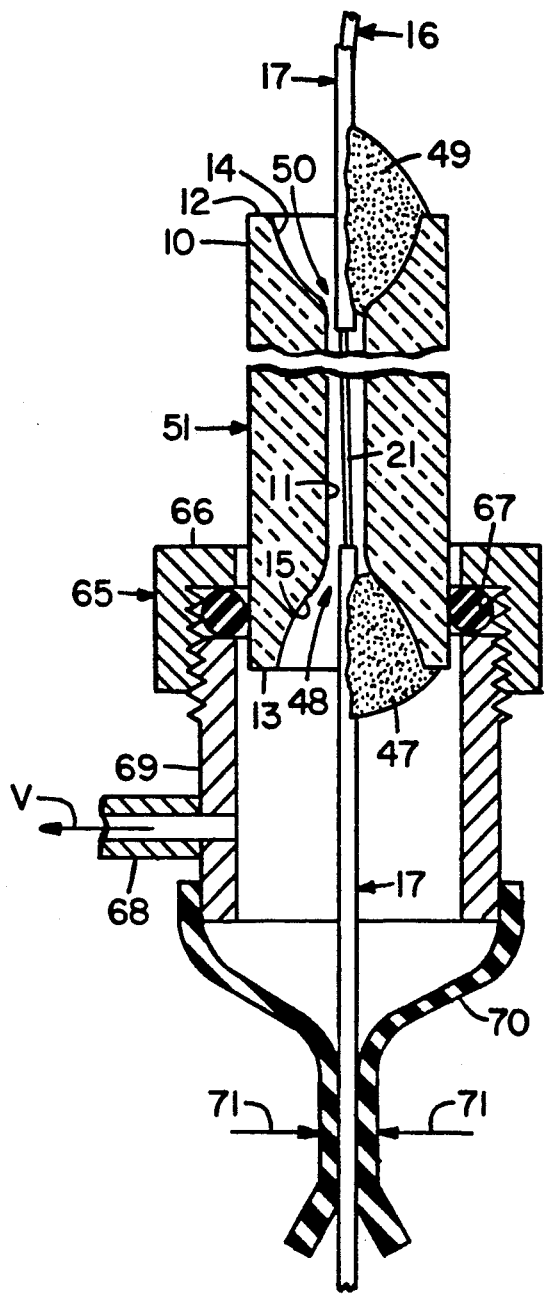
FIG. 3 is a cross-sectional view of a coupler preform connected to apparatus for evacuating the tube.

As shown in FIGS. 3 and 4, small amount 47 of glue is applied to one side of fibers 16 and 17 to attach them to one side of funnel 15 while leaving an opening 48 which permits access to bore 11 between glue 47 and the remainder of the funnel 15. A drop 49 of glue is similarly applied between fibers 16 and 17 and funnel 14, leaving bore access opening 50 between glue 49 and funnel 14. If the glue is a UV light curable epoxy, UV light can be directed on the drop 47 immediately after each drop is applied or the glue can be cured after both of the drops 47 and 49 are applied.

Figure 5:
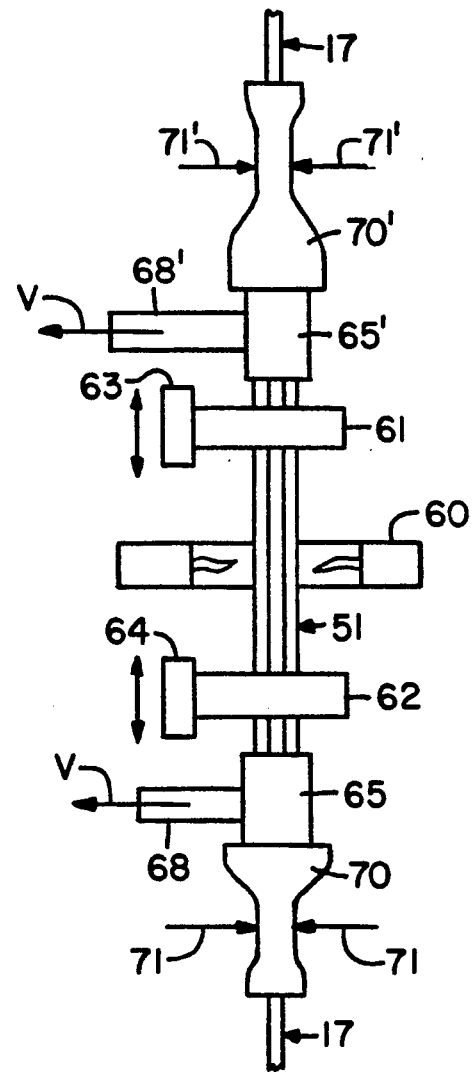
FIG. 5 is a schematic illustration of coupler forming apparatus.

Coupler preform 51 of FIG. 3 can then be inserted into the draw apparatus of FIG. 5 where tube midregion 22 is collapsed onto optical fibers 21 and 22 and stretched to form the coupling region. The open space in each funnel is then filled with glue to increase the pull strength of the optical fiber pigtails extending from the ends of the coupler. If the tube did not have funnels, the drop of glue would be placed at the end of the bore.

Figure 6:
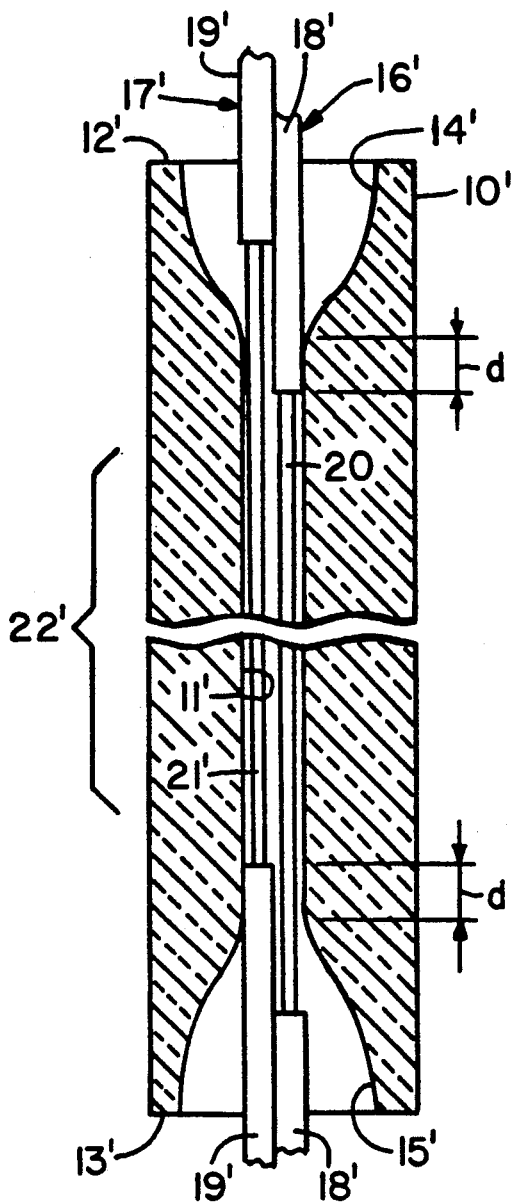
FIG. 6 is a cross-sectional view of a glass capillary tube illustrating an alternative location of the fiber coatings in the bore.
Figure 2:
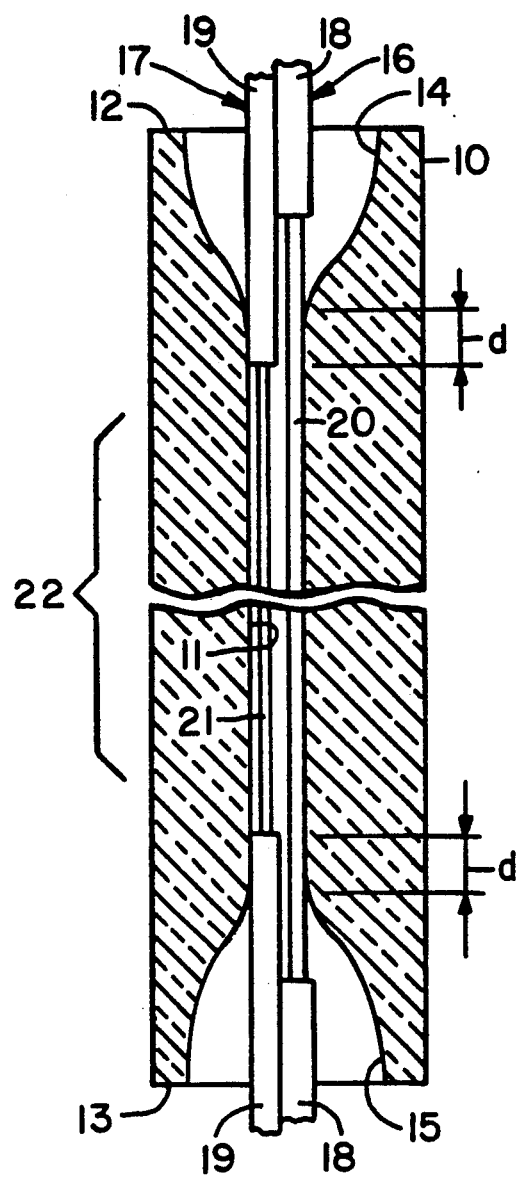
FIG. 2 is a cross-sectional view of a glass capillary tube illustrating the location of the fiber coatings in the bore.

A further embodiment is illustrated in FIG. 6 wherein elements similar to those of FIG. 2 are represented by primed reference numerals. The portions of coatings 18' and 19' that are stripped from fibers 16' and 17', respectively, are the same length or nearly the same length. The length of the uncoated portion of the first inserted fiber, fiber 16', for example, must be long enough that it can extend through bore 11' and fiber coatings 18' can be moved to one side in funnels 14' and 15' to enable one of the coated ends of coated fiber 17' to be inserted into bore 11' through the space that remains. Fiber 17' is positioned such that coating 19' extends a distance d beyond the bottom of funnel 15' into bore 11'. Fiber 16' is then repositioned such that coating 18' extends a distance d beyond the bottom of funnel 14' into bore 11'. The coated portions of the fibers are thus staggered in bore 11' as shown in FIG. 6.

EXAMPLE 1

The following specific example concerns a method of making a 2×2 3 dB fiber optic coupler. A glass capillary tube 10 was formed by a flame hydrolysis process similar to those disclosed in U.S. Pat. No. 4,165,223 and U.S. Pat. No. 5,203,898. The reactants, SiCl$_4$ and BCl$_3$ were supplied to a flame hydrolysis burner that directed a stream of B$_2$O$_3$-doped SiO$_2$ particles toward a mandrel. The inner region was formed by employing a sufficient flow of BCl$_3$ while a first coating was formed by traversing the burner with respect to the mandrel a predetermined number of times. With the burner continuing to traverse the mandrel, the flow rate of BCl$_3$ was increased at a rate sufficient to produce a transition region of the desired width. After the formation of the transition region, the BCl$_3$ was flowing at a rate sufficient to produce the outer region, and the burner traversed the mandrel a sufficient number of times to form an outer coating. The mandrel was removed from the porous preform which was then dried and consolidated to form a dense glass blank. The blank was then drawn to form an elongated tube, the outside diameter of which was 2.65 mm and the bore diameter of which was 380 gm. The elongated tube was severed into coupler tubes, each having a 3.2 cm length. The length of bore 11 was approximately 27 mm. The inner region of tube 10 was composed of SiO$_2$ doped with about 3.0 wt. % B$_2$O$_3$. The outer region was composed of SiO$_2$ doped with about 10 wt. % B$_2$O$_3$. The transition region occured at 35% of the distance between the inner surface of the tube and the outer surface thereof. The width of the transition region was about 2.6% of the thickness of the tube. Each of the funnels 14 and 15 was formed in accordance with the teachings of U.S. Pat. No. 5,152,816, which is incorporated herein by reference. One end of tube 10 was heated while NF$_3$ was flowed into the other tube end; the gas fractionated and etched the heated end of tube 10 as it exited. Bore 11 was flushed with ethyl alcohol; tube 10 was then pressed into clamp 28.

Two 3 m lengths 16 and 17 of coated optical fiber were severed from a reel of fiber; they comprised 125 μm diameter single-mode optical fibers 20 and 21 having 250 μm diameter urethane acrylate coatings 18 and 19, respectively. Each of these fibers was a dispersion shifted fiber of the type taught in U.S. Pat. No. 4,715,679. A 29 mm long portion of coating 18 was stripped from coated fiber 16 which was then wiped with a lintless cloth dampened with ethyl alcohol to remove loose material generated by the coating stripping step. A first end of fiber 16 was threaded through bore 11, the bore being lubricated by squirting ethyl alcohol into it as necessary. After the ends of coating 18 were centered in funnels 14 and 15, the first end was placed in groove 32 and secured by clamp 30. The second end of fiber 16 was placed in groove 40, pulled slightly, secured by clamp 44, and placed in pulley 24. A 7 g weight 23 was then clamped to the second end of fiber 16. Tube 10 was moved in the direction of arrow A to move the uncoated portion of fiber 16 to one side of bore 11.

A 23 mm long portion of coating 19 was stripped from coated fiber 17, and the fiber was cleaned with the alcohol containing cloth. A first end of fiber 17 was threaded through tube 10 (ethyl alcohol being employed as a lubricant) until the ends of coating 19 were centered in bore 11. The first end of fiber 17 was then placed in groove 33, and secured by clamp 31. The second end of fiber 17 was placed in groove 41, pulled slightly, and secured by clamp 45. A 7 g weight 26 was clamped to the second end of fiber 17 which extended from pulley 25. Excess alcohol was blown from the tube bore by dry nitrogen. Clamps 44 and 45 were released, and weights 23 and 26 tensioned the fibers. Tube 10 was then released from clamp 28 which was moved away from tube 10 in the direction of arrow B. An operator observed through a microscope the location of the short stripped section of fiber and moved the tube, as necessary to center the short stripped section of fiber in the bore. The ends of coating 19 then protruded about 2 mm beyond the bottoms of the funnels into each end of bore 11. The fibers were grasped between device 42 and post 39 and between device 34 and post 36 to bring them together as shown by solid lines 16 and 17 (FIG. 1).

The fibers were tacked to the funnels as described above using UV cure epoxy resin code No. 2728 manufactured by Electrolite Corporation of Danbury, Connecticut. A small amount 47 of the glue was carefully applied to one side of the tube to attach fibers 16 and 17 to funnel 15 while ensuring the presence of opening 48. Glue 47 was cured by exposure to UV light. A small amount 49 of the glue was then carefully applied to the second side of the tube to attach fibers 16 and 17 to funnel 14 while ensuring the presence of opening 50; it was cured. The fiber pigtails extending from the coupler preform were color coded.

Preform 51 was then inserted through ring burner 60 (FIG. 5) and was clamped to draw chucks 61 and 62 which were mounted on motor controlled stages 63 and 64. The fibers were threaded through the vacuum attachments 65 and 65', which were then sealed to the ends of preform 51. Referring to FIG. 3, vacuum attachment 65 was slid over the end of tube 10, and collar 66 was tightened, thereby compressing O-ring 67 against tube 10. Vacuum was supplied to tube 69 through line 68. One end of a length of thin rubber tubing 70 was attached to that end of vacuum attachment 65 opposite preform 51; the remaining end of the tubing extending within tube clamping means (not shown). Upper vacuum attachment 65' was similarly associated with line 68', tubing 70' and tube clamping means. The coated portions of the fibers extended from tubing 70 and 70'. When air pressure is directed against tubing 70 and 70' as indicated by arrows 71, 71', to clamp the tubing against the fibers extending therethrough, bore 11 is evacuated through line 68.

With a vacuum of 50.8 cm of mercury connected to the tube bore, ring burner 60 was ignited. Flames were generated by supplying gas and oxygen to the burner at rates of 0.33 slpm and 0.67 slpm, respectively. The flame from ring burner 60 heated tube 10 for about 25 seconds, and midregion 22 collapsed onto optical fibers 20 and 21.

Figure 7:
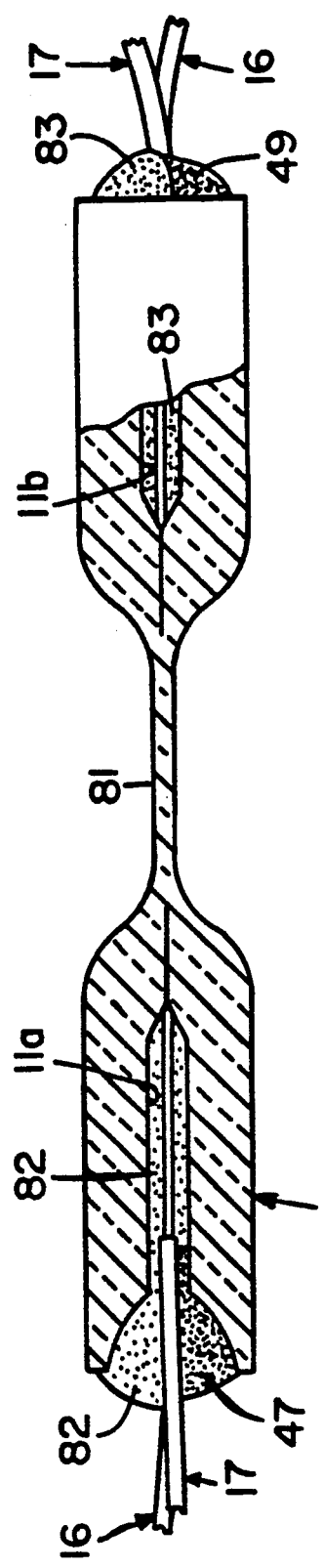
FIG. 7 is a partial cross-sectional view of a drawn coupler that has been sealed at its ends.

After the tube cooled, the burner was reignited, the flow rates of the gas and oxygen having been increased to 0.37 slpm and 0.74 slpm, respectively. The flames heated the center of the collapsed region to the softening point temperature of the materials thereof. After about 12 seconds, the supply of oxygen to burner 60 was turned off. Stages 63 and 64 were pulled in opposite directions at a combined rate of 0.60 cm/sec to elongate tube 10. The stretching operation lengthened tube 10 by about 11.0 mm to form a fiber optic coupler 80 having neckdown region 81 (FIG. 7). After the coupler cooled, the vacuum lines were removed. The coupler remained in the chucks during the application of additional glue to funnels 14 and 15 and the uncollapsed bore portions 11a and 11b. This can be done in accordance with the teachings of U.S. Pat. No. 5,251,276.

One end of an 80 μm outside diameter hollow silica microtube was connected to a source of vacuum. The remaining end was inserted through funnel 15 and opening 48 and into a first uncollapsed bore portion 11a (FIG. 7) until it reached the bottom thereof. A drop of Electrolite 2500 epoxy resin made by Electrolite Corporation of Danbury, Connecticut, was placed in funnel 15. Bore portion 11a was evacuated through the hollow filament, thus causing the glue to flow into bore portion 11a. The glue then flowed a very short distance into the microtube until it reached a point where it blocked the vacuum and could flow no further. This gluing procedure was repeated at second bore portion 11b. The glue was cured by exposure to ultraviolet light, and the coupler was removed from the chucks. The hollow filament was severed, the severed piece remaining in the cavity.

This process produced more than one hundred 3 dB couplers that operated at a predetermined wavelength such as 1480 nm. Median excess device loss was about 0.2 dB, and the lowest measured loss was 0.01 dB.

EXAMPLE 2

A method similar to Example 1 was employed to produce 2×2 10 dB fiber optic couplers, the difference being the distance that preform 51 was stretched.

A coupler preform was made by threading fibers into a tube and tacking the fibers to the tube funnels as described in Example 1. The preform was inserted into the apparatus of FIG. 5 as described above.

Tube 10 was initially collapsed onto the fibers. After the tube cooled, the burner was reignited, and the flames heated the center of the collapsed region. After about 25 seconds, the supply of oxygen to burner 60 was turned off. Stages 63 and 64 were pulled in opposite directions at a combined rate of 0.60 cm/sec to elongate tube 10. The stretching operation lengthened tube 10 by about 0.794 cm.

This process produced more than one hundred 10 dB couplers that operated at a predetermined wavelength such as 1558 nm. Median excess device loss was about 0.2 dB, and the lowest measured loss was 0.10 dB.

COMPARATIVE EXAMPLE

The method of Example 1 replaced a method that was similar to the method of Example 1 except for the following differences. A 29 mm long portion of coating was stripped from both of the coated fibers; the uncoated fiber portions being a few millimeters longer than the tube bore. One of the fibers was threaded through the tube bore until the uncoated portion was centered in the bore. The second fiber was then threaded through the tube bore until its uncoated portion was centered in the bore. The ends of the coated portions of both fibers were approximately centered in the funnels. The fibers were tacked to the tube funnels as described in Example 1. The preform was inserted into the apparatus of FIG. 5 where tube 10 was collapsed onto the fibers and the preform was elongated as described in Example 1.

This process produced more than one hundred 3 dB couplers that operated at a predetermined wavelength such as 1475 nm. Median excess device loss was about 0.5 dB, and the lowest measured loss was 0.3 dB.

I claim:

1. A fiber optic coupler comprising
   an elongated body of matrix glass having a midregion and first and second end surfaces,
   first and second optical fibers extending through said midregion, said fibers being fused together and to said midregion, the diameter of the central portion of said midregion being smaller than the diameters of said body at said end surfaces,
   first and second longitudinal bore portions extending from said midregion toward said first and second end surfaces, respectively, said fibers extending through said first and second bore portions,
   each of said fibers having a protective coating except for an uncoated portion within a portion of said elongated body, the protective coating of only one of said fibers extending into said first bore portion, and the protective coating of only one of said fibers extending into said second bore portion.

2. The coupler of claim 1 further comprising first and second funnels connecting the ends of said tube bore portions opposite said midregion to said first and second end surfaces, respectively, the uncoated portion of one of said fibers extending from said first longitudinal bore portion into said first funnel and the uncoated portion of one of said fibers extending from said second longitudinal bore portion into said second funnel.

3. The coupler of claim 2 wherein said first coated portion of said second fiber extends into said first bore portion, and said second coated portion of said second fiber extends into said second bore portion.

4. The coupler of claim 2 wherein said first coated portion of said first fiber extends into said first bore portion, and said second coated portion of said second fiber extends into said second bore portion.

5. The coupler of claim 1 wherein the coated portions of said fibers extend at least 2 mm into said bore portions.

6. A fiber optic coupler comprising
an elongated body of matrix glass having a midregion and first and second end surfaces,
first and second optical fibers extending through said midregion, said fibers being fused together and to said midregion, the diameter of the central portion of said midregion being smaller than the diameters of said body at said end surfaces,
first and second longitudinal bore portions extending from said midregion toward said first and second end surfaces, respectively, said fibers extending through said first and second bore portions,
each of said fibers having a protective coating except for an uncoated portion within a portion of said elongated body, the protective coating of only said first fiber extending into said first and second bore portions.

7. The coupler of claim 6 further comprising first and second funnels connecting the ends of said tube bore portions opposite said midregion to said first and second end surfaces, respectively, the uncoated portion of one of said fibers extending from said first longitudinal bore portion into said first funnel and the uncoated portion of one of said fibers extending from said second longitudinal bore portion into said second funnel.

8. The coupler of claim 7 wherein said first coated portion of said second fiber extends into said first bore portion, and said second coated portion of said second fiber extends into said second bore portion.

9. The coupler of claim 7 wherein said first coated portion of said first fiber extends into said first bore portion, and said second coated portion of said second fiber extends into said second bore portion.

10. The coupler of claim 6 wherein the coated portions of said fibers extend at least 2 mm into said bore portions.

11. A fiber optic coupler comprising
an elongated body of matrix glass having a midregion and first and second end surfaces,
first and second optical fibers extending through said midregion, said fibers being fused together and to said midregion, the diameter of the central portion of said midregion being smaller than the diameters of said body at said end surfaces,
first and second longitudinal bore portions extending from said midregion toward said first and second end surfaces, respectively, said fibers extending through said first and second bore portions,
each of said fibers having a protective coating except for an uncoated portion within a portion of said elongated body, the protective coating of only said first fiber extending into said first bore portion, and the protective coating of only said second fiber extending into said second bore portion.

12. The coupler of claim 11 further comprising first and second funnels connecting the ends of said tube bore portions opposite said midregion to said first and second end surfaces, respectively, the uncoated portion of one of said fibers extending from said first longitudinal bore portion into said first funnel and the uncoated portion of one of said fibers extending from said second longitudinal bore portion into said second funnel.

13. The coupler of claim 12 wherein said first coated portion of said second fiber extends into said first bore portion, and said second coated portion of said second fiber extends into said second bore portion.

14. The coupler of claim 12 wherein said first coated portion of said first fiber extends into said first bore portion, and said second coated portion of said second fiber extends into said second bore portion.

15. The coupler of claim 11 wherein the coated portions of said fibers extend at least 2 mm into said bore portions.

* * * * *